2,823,417

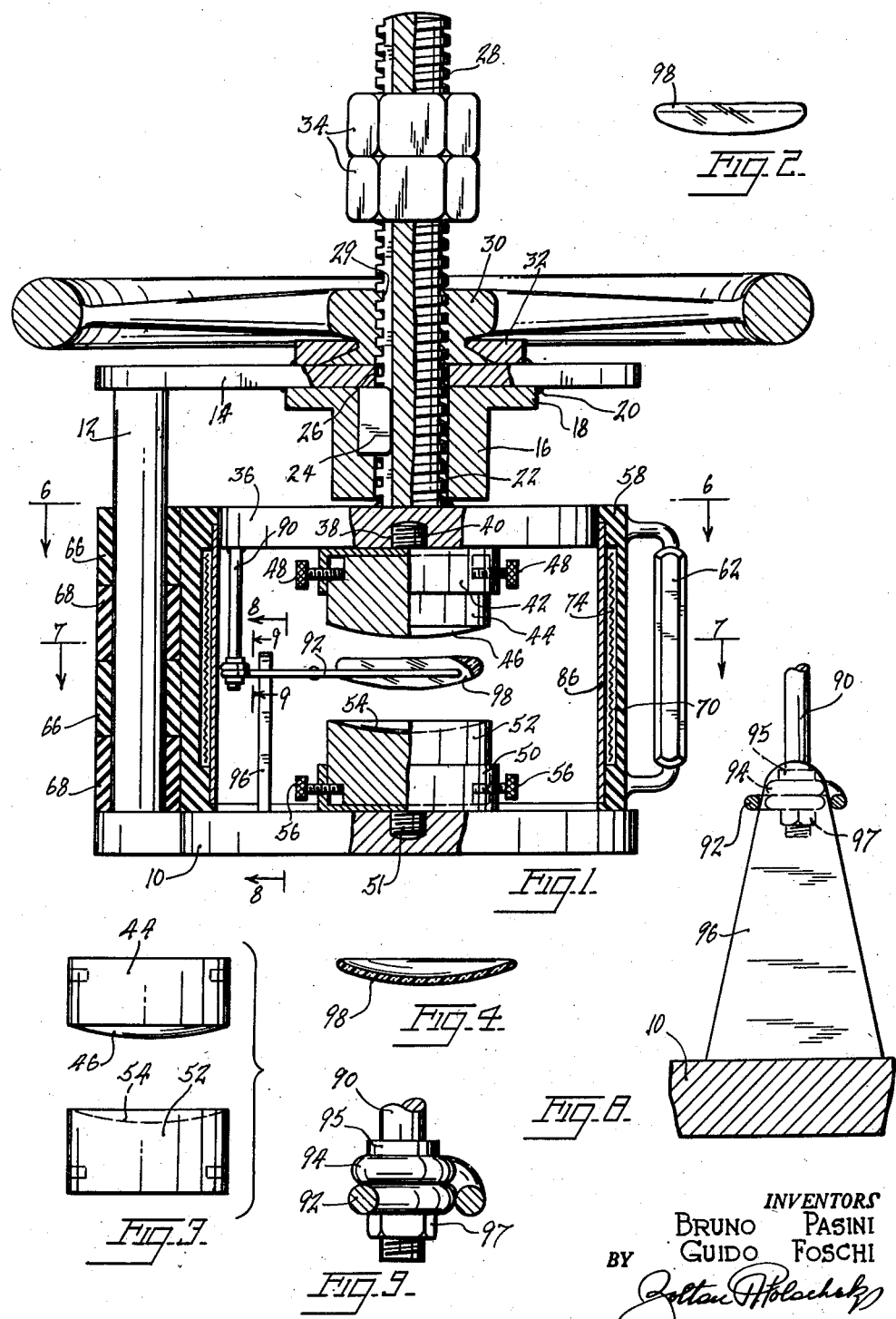

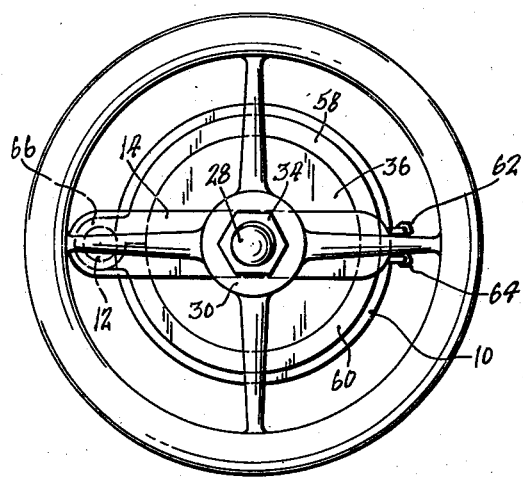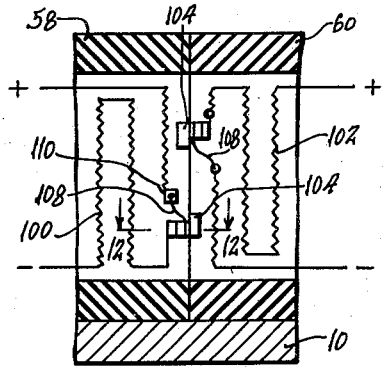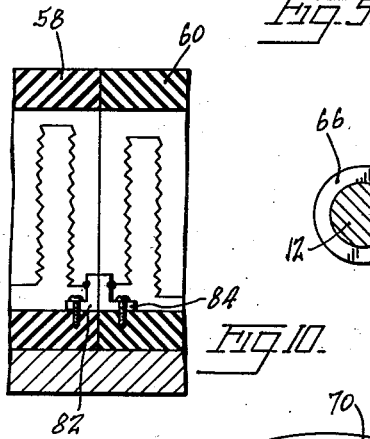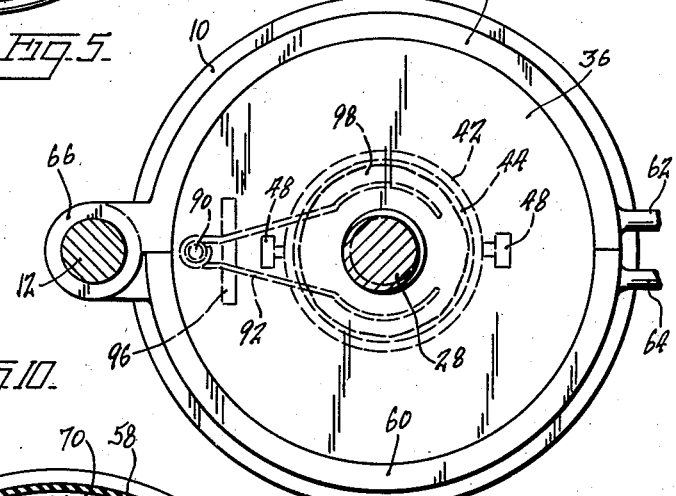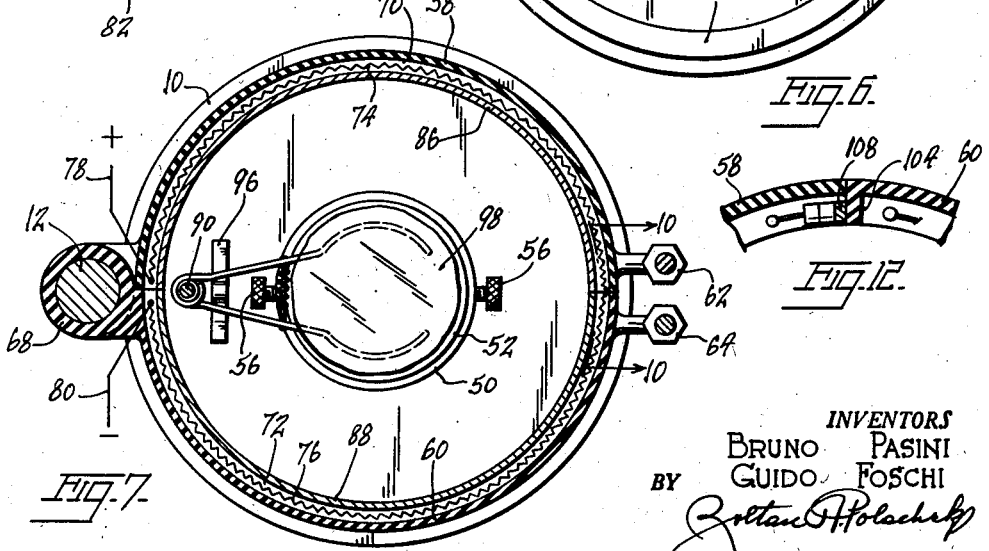
INVENTORS
BRUNO PASINI
GUIDO FOSCHI
ATTORNEY United States Patent Office 2,823,417
Patented Feb. 18, 1958

MEANS FOR PRODUCING OPTICAL LENSES FROM PLASTIC MATERIALS

Bruno Pasini and Guido Foschi, Milan, Italy, assignors to Ermanno Zanini, Milan, Italy Application May 20, 1954, Serial No. 431,169

2 Claims. (Cl. 18—17)

This invention relates to the art of producing optical lenses from plastic materials. More particularly, the invention has reference to a means for producing lenses of the type stated, which facilitates the conditioning of the lens prior to forming of the same into a desired shape.

An object of importance is to provide apparatus of the type stated which will be so designed as to inclose the lens blank in a space in which said blank can be readily heated to a predetermined temperature found to be the optimum temperature for conditioning the same for formation to a desired shape between suitable die members, the apparatus being so designed as to permit the die members to be disposed within the cavity in which the lens blank is heated, for advancement of one die member toward the other without opening of said cavity.

Another object of importance is to locate the lens blank between the spaced die members during the heating of the blank, with the space in which the blank is heated being fully closed during this stage of the operation, the apparatus including means disposed exteriorly of the heating space for shifting one die member toward the other while simultaneously lowering the lens blank into supported position upon said other die member.

Another object of importance is to provide apparatus of the type stated wherein the means for shifting the lens blank into supported position upon one of the die members will include a cam or wedge-like spreader element, so designed as to cause supporting jaws on which the lens blank is normally positioned to be spread apart simultaneously with disposition of the blank upon one of the die members.

Another object of importance is to provide a device of the nature referred to wherein movement of the die members away from one another will be accompanied at the same time, by the return of the lens-supporting jaws into position in which said jaws support the lens, thus to raise the finished lens out of engagement with the die members, preliminary to opening of the device and removal of said lens.

Another object of importance is to provide means in the apparatus of the nature referred to wherein the lens blank, supporting jaws, and die members will be confined between a pair of hinged, arcuate casing sections, said sections including the heating means of the device, the sections being readily swung toward and away from one another as desired.

Another object of importance is to so design the casing sections and the associated heating elements as to cause energizing of said heating elements responsive to movement of the casing sections into closed position.

For further comprehension of the invention, and of the objects and advantages thereof, reference will be had to the following description and accompanying drawings, and to the appended claims in which the various novel features of the invention are more particularly set forth.

On the accompanying drawings, forming a material part of this disclosure:

Fig. 1 is a view partly in side elevation and partly in vertical section of apparatus formed in accordance with the present invention.

Fig. 2 is an edge elevational view of the lens blank.

Fig. 3 is a side elevational view of the die members per se.

Fig. 4 is a sectional view taken diametrically through the finished optical lens.

Fig. 5 is a top plan view of the apparatus.

Fig. 6 is a sectional view taken substantially on line 6—6 of Fig. 1.

Fig. 7 is a sectional view taken substantially on line 7—7 of Fig. 1.

Fig. 8 is a greatly enlarged, sectional view taken substantially on line 8—8 of Fig. 1.

Fig. 9 is a greatly enlarged, detail sectional view taken substantially on line 9—9 of Fig. 1.

Fig. 10 is a detail sectional view taken substantially on line 10—10 of Fig. 7.

Fig. 11 is a view similar to Fig. 10 showing a modified construction.

Fig. 12 is an enlarged, detail sectional view taken substantially on line 12—12 of Fig. 11.

The reference numeral 10 has been applied to a flat, circular base, said base having a radial projection on which is fixedly mounted a vertically disposed post 12 of circular cross section. Fixedly secured to the upper end of the post 12 is a horizontally disposed, flat, elongated support bar 14, said bar 14 projecting laterally in one direction from the post 12.

A cylindrical block 16 is formed at its upper end with a peripheral flange 18 welded as at 20 to the underside of the bar 14.

Block 16 has a vertically disposed, centrally located, smooth-walled bore 22 opening upon the opposite ends thereof, and fixedly mounted in the wall of the bore 22 is a key 24 projecting radially and inwardly of said bore 22.

The bar 14 is formed with a smooth-walled opening 26 registering with the opening 22, and extending through the registered openings is an elongated, vertically positioned screw 28, said screw being threadedly engaged in a complementary threaded opening 29 formed in a hand wheel 30 rotatably mounted upon the bar 14, said hand wheel being held against the bar by a hold-down ring 32.

It will be apparent from the construction so far illustrated and described that the rotation of the hand wheel will be effective to shift the screw 28 upwardly or downwardly, depending upon the direction of rotation of the hand wheel. The vertical movement of the screw is accomplished without rotation of the screw, the screw being held against rotation by the key 24.

Threaded upon the upper end of the screw are nuts 34, said nuts being adjustable to selected positions longitudinally of the screw and being adapted to bind against one another to provide an abutment limiting movement of the screw in a downward direction, said abutment engaging the hand wheel after the screw has been shifted downwardly to the predetermined extent.

Welded or otherwise fixedly secured to the lower end of the screw 28 is a plate 36 of flat, circular formation, having in its underside a centrally disposed, tapped recess 38 in which is engageable a complementary threaded stud 40 extending upwardly from the central part of a downwardly facing cup 42 in which is engaged a depending die 44 having a convexly formed bottom surface 46, said die 44 being held in position in the cup by said screws 48 threaded in the wall of the cup into diametrically opposed recesses of the die member 44.

Opposing the cup 42 is an upwardly facing cup 50 in which is removably engaged a stationary die member 52 having a concave upper surface 54 complementing the surface 46. Set screws 56 threaded in diametrically opposite openings of the cup 50 engage in recesses formed in the die member 52.

The device includes a pair of hinged, opposed, semicircular casing sections, said sections, being vertically disposed upon the base 10. The sections have been designated by the reference numerals 58, 60 respectively, and at one end are provided with handles 62, 64 respectively. Section 58, at its other end, has vertically spaced hinge sleeves 66, aligning with and disposed alternately to hinge sleeves 68 formed upon the corresponding end of the section 60. The hinge sleeves receive the post 12, and it will thus be seen that the sections are swingable toward and away from one another within a horizontal plane, to and from the closed positions thereof shown in Fig. 7. When the sections are swung to their closed positions, they define a circular cavity within which the die members are disposed, said cavity being of a diameter corresponding to the plate 36, the plate 36 closing the cavity at its upper end and the base 10 closing the cavity at its lower end.

Formed in the inner surfaces of the respective sections 58, 60 are shallow recesses 70, 72, said recesses being disposed over substantially the full areas of the inner surfaces of said sections. Mounted within the recesses 70, 72 are electrical resistance elements 74, 76, element 74 having a lead 78 extending to one side of a source of electric power, and element 76 having a corresponding lead 80 extending to the other side of said power source.

At their ends remote from the leads 78, 80 the resistance elements are secured to contacts 82, 84 (Fig. 10), said contacts being fixedly secured to the free ends of the casing sections, within the shallow recesses 70, 72. As a result, when the recesses are swung to a closed position, the contacts 82, 84 engage against one another, and thus, an electrical circuit is completed through the resistance elements 74, 76. When, however, the casing sections are swung apart to an open position, the circuit is broken as soon as the casing sections are initially moved away from one another.

Of course, in addition to the means illustrated for closing a circuit to the resistance elements, a separate manually operated switch can be provided, readily accessible to a user for providing a main control of the circuit.

This is considered sufficiently obvious as not to require special illustration herein.

Overlying the resistance elements 74, 76 are thin plates 86, 88 having a high thermal conductivity rating, said plates being disposed out of engagement with the resistance elements. It will be noted, in this connection, that the casing sections are formed of electrical insulation material so as to keep the resistance element fully out of engagement with any conductive material that might cause malfunctioning of the apparatus.

Means is provided in the device, carried by the downwardly movable plate 36, whereby a lens blank may be supported in position between the die members. Said means includes a depending arm 90 fixedly secured at one end to the marginal portion of the under side of the plate 36. Arm 90, at its lower end, carries a pair of jaws 92, 94. The jaws 92, 94 can be formed of lengths of wire material, each length of material being formed into a loop at one end with the arm 90 extending through the loops of the jaws, said loops loosely receiving the arm 90 to permit swinging of the jaws within a horizontal plane about the axis defined by the arm 90. Arm 90 can be provided (Fig. 9) with a stop collar 95 disposed above the loops, and a nut 97 is threaded upon the lower end of the arm 90 against the loops, to hold the jaws in place upon the arm. It will be understood that the construction illustrated in Fig. 9 can be used to preset the jaws in a desired horizontal plane relative to the plate 36, by disposition of suitable spacing washers above the loops, against the collar 95.

In any event, the jaws 92, 94 at their free ends have arcuate, opposed portions for supporting the lens blank, and normally when the parts are positioned as in Fig. 1, said arcuate, blank-supporting portions of the jaws will be closely spaced from one another to support the lens blank between the die members.

An upstanding wedge shaped spreader 96 (Fig. 8) is fixedly mounted upon the base 10, and at its upper, smaller end extends between the jaws 92, 94. As a result, when the plate 36 is lowered in the manner previously described herein the jaws 92, 94, being shifted downwardly with the arm 90, will be spread apart by the cam or spreader 96. When the jaws are spread apart, they will cause a lens blank 98 supported thereupon to ultimately come to rest upon the lower, stationary die member. It will be understood, in this connection, that the free end portions of the jaws will not be spaced apart a distance sufficient to become wholly disengaged from the lens blank until such time as the lens blank is supported upon or is very close to the stationary die member. Thereafter, the further downward movement of the plate 36 will cause the free end portions of the jaws to be disposed at opposite sides of the stationary, lower die member, with the lens blank 98 being supported upon said member.

Still further downward movement of the plate 36 will cause the upper, movable die member to engage against the upper surface of the lens blank and the lens blank will now be formed to the finished shape shown in Fig. 4.

In this connection, before the plate 36 is lowered to shape the blank between the die members, said blank will be heated to a predetermined extent, with the casing sections closed and the heating elements energized. Preferably, the lens blank is heated to no greater an extent than is sufficient to permit said blank to be readily shaped between the die members.

When the die members have been brought together with the lens blank disposed therebetween, they are left in position for a predetermined amount of time, until the blank has been fully shaped. The casing sections can be opened at any time, whether or not the lens blank is engaged between the die members, this being an important characteristic in the invention so as to control the heating action in direct relationship to the die movement. In other words, the die movement can be controlled separately from the heating action, that is, the dies can be held apart from one another while heating is taking place for a predetermined amount of time and to a predetermined temperature. The die movement, further, can be effected without regard to the temperaure, and the dies when brought together can be left together whether or not the heating elements are still energized.

This results, of course, from the mounting of the plate 36 for movement independently of the swinging movement of the casing sections 58, 60.

Heretofore, forming transparent plastic material into optical lenses has been difficult, due to the difficulty of properly controlling temperatures in relation to the die movement, and due to the difficulty, further, of properly heating the die members themselves to insure a proper formation of the lenses. However, in accordance with the present invention these difficulties are obviated, by reason of the structural characteristics described above.

In Figs. 11 and 12 there is illustrated a modified form wherein each of the casing sections has a separate resistance, the resistances of the casing sections being here designated 100, 102 respectively. The resistances 100, 102 are each provided with a separate connection to a source of electricity, permitting each resistance to be energized by a separate circuit closed therethrough.

In the form shown in Figs. 11 and 12, the movement of the casing sections toward one another through a closed position effects closing of the circuits to energize the resistances. However, the energizing of the resistances takes place in a manner different from that of the first form, and as will be noted, each casing section has a lug 104, each lug 104 being adapted to engage a spring arm 108 carried by the other casing section, to shift said spring arm into engagement with a stationary contact 110, also carried by said other casing section and normally spaced from the associated spring arm.

In other words, the spring arm 108 and stationary contact 110 of each casing section constitutes a switch, that is normally opened and that controls energizing of the resistance of the same casing section. However, when the casing sections are swung to a closed position, the lug 104 of each casing section is adapted to close the switch of the other casing section, the switches of both casing sections being closed simultaneously to energize both resistances at the same time. When the casing sections are then swung to open position, the resistances will be immediately deenergized.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. Apparatus for shaping a plastic lens blank comprising a base, a hollow casing supported on the base, an upstanding post on said base, adjacent its periphery, outside said casing, a radial arm on the top of said post, said arm having an opening intermediate its ends, a screw extending through said opening and being vertically movable therethrough, a supporting plate carried on the bottom end of said screw, a hand wheel above said arm around said screw for moving the same up and down, an inverted cup-shaped member carried on the undersurface of the plate, a cup-shaped member mounted on the base in opposition to said inverted cup-shaped member, complementary die members secured to said inverted cup-shaped and cup-shaped members, a post depending from the plate adjacent its periphery inside the casing, opposed spring arms having arcuate end portions radially mounted on the bottom end of said latter post, said end portions being adapted to releasably support a lens blank between the die members.

2. Apparatus as defined in claim 1, characterized by means supported on the casing for heating the lens blank and an inverted V-shaped camming plate vertically disposed on the base in the path of movement of the spring arms upon downward movement of the plate for spreading said arms apart to release the lens blank.

References Cited in the file of this patent

UNITED STATES PATENTS

| | | |
|---|---|---|
| 1,846,012 | Becker | Feb. 23, 1932 |
| 1,898,784 | Mey | Feb. 21, 1933 |
| 2,065,186 | Keil | Dec. 22, 1936 |
| 2,069,746 | Andrews | Feb. 9, 1937 |
| 2,289,524 | Smith et al. | July 14, 1942 |
| 2,326,271 | Wessinger | Aug. 10, 1943 |
| 2,511,914 | Haas | June 20, 1950 |
| 2,698,501 | Peek et al. | Jan. 4, 1955 |